UNITED STATES PATENT OFFICE 2,382,730

LUBRICANT

Eugene Lieber, West New Brighton, Staten Island, N. Y., assignor to Standard Oil Development Company, a corporation of Delaware No Drawing. Application July 15, 1943,
Serial No. 494,816

5 Claims. (Cl. 252—57)

This invention relates to a novel type of chemical product and to methods of preparing and using same and more particularly it relates to the preparation of novel organic chemical compounds especially adapted for use as pour depressors in waxy mineral lubricating oils.

Heretofore pour depressors have largely been made by processes which lead to the production of complex polymeric condensation products of relatively high molecular weight, e. g., at least 1,000 and generally nearer to 2,000 or more. Such products are generally made by chemical condensation involving the use of a Friedel-Crafts catalyst, such as aluminum chloride.

One object of the present invention is to make pour depressors of a substantially simpler chemical structure and lower molecular weight. Another object is to prepare pour depressors without the use of a Friedel-Crafts catalyst. A still further object is to prepare pour depressors from raw materials which are readily available and by a relatively simple chemical process.

Broadly the invention comprises the preparation of products suitable for use as pour depressors by esterification or etherification of organic compounds of the class of phthaleins and sulfonphthaleins. These compounds are readily made by reacting an aromatic acid or anhydride, such as phthalic acid or phthalic anhydride

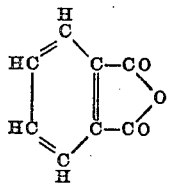

and sulfo derivative thereof, e. g. o-sulfo-benzoic acid or ortho-sulfo-benzoic anhydride

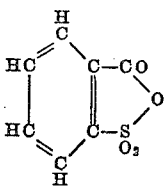

with an aromatic hydroxy compound, such as phenol, with the resultant formation of an hydroxy aromatic phthalein, e. g. phenolphthalein. This reaction may be illustrated by the following equation:

*Equation 1*

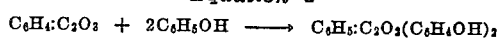

These phthaleins are then subjected to a chemical reaction which converts the hydroxyl groups into either ester or ether groups, as by Equation 2 or 3 respectively, in which R represents an aliphatic hydrocarbon radical and X represents halogen:

*Equation 2*

*Equation 3*

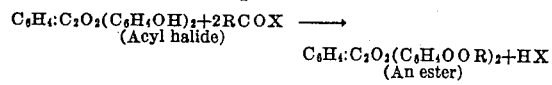

During the reactions expressed by Equations 2 and 3 it is possible that simultaneous resin formation occurs to a limited extent, so that the final product may for instance comprise a mixture of an ester and a resin, and/or other complex reaction products.

The production of phenol sulfonphthalein (an ester) from o-sulfo-benzoic anhydride is illustrated as follows:

*Equation 4*

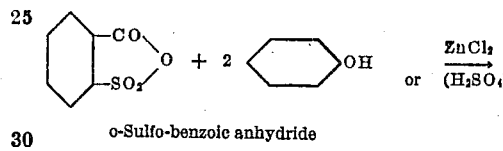

o-Sulfo-benzoic anhydride

"Phenol red"
Phenolsulfonphthalein

The phthaleins can be prepared from only phthalic acid or anhydride. The only other acid which will give this reaction is terephthalic acid

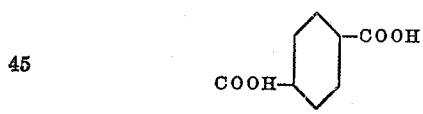

which involves a shift to

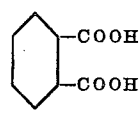

Similarly instead of using phenol as the aromatic hydroxy compound to be reacted with the aromatic acid, other aromatic hydroxy compounds may be used, such as naphthols, various alkyl phenols, amino-phenols such as cresols, thymol, resorcinol, pyrogallol, petroleum phenols, especially as obtained from petroleum hydrocarbons of the naphtha to gas boiling range, and various other pure or mixed commercial products such as obtained from the distillation of coal tar, etc.

In using the phthaleins and sulfonphthaleins for the purposes of the present invention, they may be either used as such, i. e., with the hydroxy groups present, or they may first be converted into the corresponding metal, e. g. sodium derivative, so that when subsequently reacted with either an alkyl halide or an acyl halide, the sodium or other metal atom will combine with the halogen atom to form an inorganic salt, such as sodium chloride or sodium bromide which may then be filtered off in solid form from an organic solvent solution of the desired ether or ester derivative of the phthalein.

The organic halogen compound to be reacted with the phthalein is preferably selected from the group consisting of compounds having the general formula RX and RCOX, wherein R is an aliphatic hydrocarbon group and preferably a substantially saturated or paraffinic hydrocarbon group and preferably having at least 10 carbon atoms, and is a halogen, such as chlorine, bromine, etc. Examples of suitable halogen compounds of this nature include stearyl chloride or the corresponding acylchloride derived from high molecular weight fatty acids obtained upon the oxidation of paraffin wax, etc., or acyl halides of petroleum naphthenic acids. Any of such acyl halides may be derived by usual methods of organic chemistry such as by reacting the fatty naphthenic or other carboxylic acids, with phosphorus trichloride. As examples of the alkyl halides which may be used, may be mentioned octadecyl chloride or bromide, cetyl chloride, lauryl bromide, as well as corresponding halides of higher alcohols obtained by the oxidation of paraffin wax, which are generally mixtures of alcohols having about 16 to 22 carbon atoms. The halogen atom of the alkyl halide may be in either a primary, secondary or tertiary position.

In carrying out the invention, it is preferred to first suspend or dissolve the phthalein in a suitable solvent such as a refined petroleum naphtha, kerosene, benzene, xylene, tetrachlorethane, ortho dichlor benzene, tetralin, carbon tetrachloride and then add the alkyl halide or acyl halide with heating and stirring until the reaction has been substantially completed as may be evidenced by the cessation of the evolution of hydrogen chloride or other hydrogen halide, or by the precipitation of sodium chloride if the sodium phthalein compounds were used as raw material. The temperature to be used may range from about room temperature to about 400° F. and preferably 150° to 350° F. and with a reaction time ranging from about 1 to 30 hours, ordinarily about 2 to 20 hours being sufficient. A convenient method of maintaining the desired temperature is to use a solvent which boils at the desired temperature and then reflux the reaction mixture until the reaction has been completed.

After the completion of the esterification or etherification reaction, any metal halide is filtered off if such has been formed, and then the reaction mixture is subjected to distillation, preferably under reduced pressure equivalent to vacuum distillation under an absolute pressure at least as low as 5 mm. of mercury, steam distillation being satisfactory, in order to remove solvent and any unreacted raw material.

The final product obtained as distillation residue constitutes the desired phthalein ether or ester or mixture thereof with some resin. It is found to be soluble in mineral oils and to have the property of depressing, i. e., lowering, the pour point of waxy mineral lubricating oils when added thereto in small amounts, such as 0.1 to 5.0%, preferably about 1 to 3%, by weight.

If desired, the phthalein ethers or esters may be further subjected to a polymerizing step as by heating to 250–260° C., the degree of polymerization being controlled by the time of heating. The resultant polymeric phthalein ethers or esters also have pour-depressing properties.

The invention will be better understood from a consideration of the following specific examples which are given merely for the sake of illustration and without the intention of limiting the invention thereto.

*Example 1*

56 grams of stearic acid were converted to stearyl chloride, by treating with 14 g. of phosphorous trichloride and added to 32 g. of phenolphthalein.

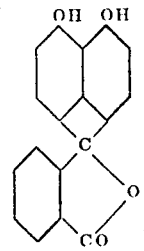

dissolved in 400 cc. of tetrachlorethane as solvent and refluxed until substantially all of the hydrogen chloride had been removed. This required 6 hours. The product was then recovered by distilling off the solvent.

A yield of 97 grams of a very viscous yellow liquid was obtained as product. When 2% of the product, prepared as described above, was blended in a wax-containing oil, whose original pour point was +30° F., the pour point of the blended oil was found to be +5° F.

*Example 2*

56 g. of a synthetic paraffin-wax fatty acid (average molecular weight 280–290) were converted to the "acyl chloride" by treating with 14 grams of phosphorous trichloride, and added to 32 g. of phenolphthalein dissolved in 400 cc. of ortho-dichlor-benzene as solvent and refluxed for 22 hours, at which time evolution of hydrogen chloride gas had substantially ceased. The product was then recovered by distilling off the solvent.

A yield of 100 grams of a brownish-wax-like solid was obtained as product. When 2% of the product, prepared as described above, was blended in a wax-containing oil, the pour point was lowered from +30° F. to 0° F.

*Example 3*

28 g. of stearic acid were converted to stearyl chloride by treating with 7 grams of phorphorous trichloride. Likewise, 10 grams of sebacic acid were converted to sebacyl chloride by treating with 8 grams of phosphorous trichloride. The stearyl chloride and sebacyl chloride were then added to a solution of 32 grams of phenolphthalein in 400 cc. of ortho-dichlor-benzene as solvent and refluxed for 23 hours, at which time evolution of hydrogen chloride gas had substantially ceased. The product was then recovered by distilling off the solvent.

A yield of 75 grams of a wax-like solid was obtained as product. When 5% of the product, prepared as described above, was blended in a waxy-oil, the pour point was lowered from +30° F. to —5° F.

The above examples show that surprisingly effective pour depressors may be obtained by reacting a phthalein by an aliphatic acyl halide in order to form the corresponding phthalein aliphatic ester.

In the appended claims the term "phthalein" is intended to include both the pure phthaleins as well as the sulfo derivatives thereof, such as disclosed.

It is not intended that this invention be limited to the specific examples which have been given merely for the sake of illustration.

I claim:

1. A lubricant comprising a major proportion of waxy mineral lubricating oil and a small but pour depressing amount of a phthtalein in which at least one hydroxyl hydrogen is replaced by a radical selected from the group consisting of —R and —(O)C—R, in which R is an alkyl radical.

2. A lubricant comprising a major proportion of waxy mineral lubricating oil and a minor but pour depressing amount of an oil-soluble reaction product of phenolphthalein with a material having more than 10 carbon atoms per molecule and selected from the group consisting of an alkyl halide and an acyl halide.

3. A lubricant comprising a major proportion of waxy mineral lubricating oil and a minor but pour-depressing amount of an esterification product of phenolphthalein with an acyl chloride having more than 10 carbon atoms per molecule.

4. A lubricant comprising a major proportion of waxy mineral lubricating oil and a minor but pour-depressing amount of an esterification product of phenolphthalein with high molecular weight synthetic fatty acids obtained by the oxidation of paraffin wax.

5. A lubricant comprising a major proportion of waxy mineral lubricating oil and a minor but pour-depressing amount of an esterification product of phenolphthalein with stearyl chloride.

EUGENE LIEBER.